(12) United States Patent
Emeott et al.

(10) Patent No.: US 7,194,261 B2
(45) Date of Patent: Mar. 20, 2007

(54) METHOD AND APPARATUS FOR FACILITATING DATA TRANSMISSIONS

(75) Inventors: Stephen P. Emeott, Rolling Meadows, IL (US); Ye Chen, Schaumburg, IL (US); Nattavut Smavatkul, Elk Grove Village, IL (US)

(73) Assignee: Motorola, Inc., Schaumburg, IL (US)

( * ) Notice: Subject to any disclaimer, the term of this patent is extended or adjusted under 35 U.S.C. 154(b) by 479 days.

(21) Appl. No.: 10/645,246

(22) Filed: Aug. 21, 2003

(65) Prior Publication Data

US 2005/0043027 A1  Feb. 24, 2005

(51) Int. Cl.
*H04Q 7/20* (2006.01)
*H04J 3/16* (2006.01)

(52) U.S. Cl. ............... 455/426.2; 455/574; 455/127.5; 370/493; 370/346; 370/311

(58) Field of Classification Search ............. 455/435.1; 370/493, 311, 346
See application file for complete search history.

(56) References Cited

U.S. PATENT DOCUMENTS

2004/0013135 A1*  1/2004  Haddad ....................... 370/493
2004/0081133 A1    4/2004  Smavatkul

OTHER PUBLICATIONS

Part 11: Wireless LAN Medium Access Control (MAC) and Physical Layer (PHY) Specifications, ANS/IEEE Std 802.11, 1999 Edition, Copyright © 1999 by The Institute of Electrical and Electronics Engineers, Inc., New York, New York, USA, ISBN 0-7381-1658-0 (pages Title, Cover, iv-xvi, 1-512), no month listed.

* cited by examiner

*Primary Examiner*—Erika A. Gary (57) ABSTRACT

An access point (11) for a wireless local area network (10) transmits a beacon message during a service interval period (21). This beacon message identifies, in a preferred embodiment, those subscriber units to whom the access point will shortly be transmitting data. Subscriber units that are not identified in the beacon message and that do not have data themselves to transmit to the access point can implement a power conservation mode of operation until the next beacon message. Subscriber units that have data, such as voice information, to transmit can utilize the beacon message contents to at least estimate a likely time by when the access point will have concluded making its transmissions to the subscriber units. That estimated time can then be used to facilitate scheduling a time at which a given subscriber unit will contend for an opportunity to transmit its data to the access point. In a preferred embodiment, this scheduled transmission time can potentially occur either during a contention window that follows the service interval period or during a dynamic contention window that follows the transmissions of the access point and concludes with the conclusion of the service interval period. Subscriber units can then use intervening periods of time to effect their power conservation schemes of choice.

32 Claims, 5 Drawing Sheets

METHOD AND APPARATUS FOR FACILITATING DATA TRANSMISSIONS

TECHNICAL FIELD

This invention relates generally to wireless data transmissions and more particularly to the transmission of voice data.

BACKGROUND

Various wireless transmission embodiments are known in the art. Some such systems support the transmission of voice data (comprising, in many instances, data that represents digitized voice), some the transmission of bearer data (comprising, for example, graphic information to be displayed or alphanumeric information as corresponds to an information file), and some support the transmission of both. An example of the latter are 802.11 compliant wireless local area networks (WLANs) that support the transmission of packetized digitized voice data (thereby implementing what is often referred to as voice-over-Internet-protocol or VoIP).

In some VoIP-facilitating WLAN systems, an access point to the WLAN will poll each and every extant subscriber unit then operating within the ambit of the access point on a regular basis. When a given subscriber unit responds to such a poll inquiry the access point will then transmit any previously received and buffered data (such as voice frames) as the access point may then have for that subscriber unit. This also constitutes an opportunity for the subscriber unit to transmit its own data, including voice data, if any to the access point. Such a protocol can be relatively effectively implemented to ensure that time-sensitive and even time-critical data (including voice data) is exchanged with sufficient speed and timeliness to ensure a generally acceptable level of quality of service. Unfortunately, however, such polling-based protocols also tend to require a considerable level of attentiveness on the part of the subscriber units. That is, the subscriber units must remain in a fairly constant state of reception in order to ensure that they do not miss their poll. As a result, subscriber units in such a system will tend to consume a considerable amount of power to maintain this state of activity. Such power consumption is ill-suited to the needs of portable devices, however, and particularly portable devices that only have a relatively limited portable power source.

As a partial answer to such a need, it has at least been proposed that the initiation of a new polling cycle occur in a regularly periodic and synchronized fashion. So configured, the subscriber units can know a priori when a new polling cycle will begin. After being polled (and transmitting and/or receiving such information as then requires attention) each subscriber unit can then in turn initiate a sleep mode of operation. Such sleep modes are well known in the art and permit a given device to effectively reduce power consumption by temporarily eliminating or at least reducing various power consuming tasks (such as receiving and processing transmissions from an access point). Sleeping subscriber units then switch to an active receiving mode of operation prior to the initiation of the next polling cycle. Such an approach can provide some power-saving benefits to at least some subscriber units. The benefits can be quite anecdotal, however, and the total savings in power consumption are sometimes not considered sufficiently adequate.

In other VoIP-facilitating WLAN systems, the access point and the subscriber units will all contend with one another for use of the available communication resource or resources. Such contention-based systems can be quite effective at facilitating a timely exchange of information in a fashion that leverages to considerable effect the available communication resource. Unfortunately, however, such contention-based protocols tend to be even more demanding of power consumption and availability. This results at least in part because the subscriber units must generally remain on at all times in order to avoid missing a transmission from the access point. Consequently, such contention-based protocols are relatively ill-suited for use with portable subscriber units having only limited power capacity.

BRIEF DESCRIPTION OF THE DRAWINGS

The above needs are at least partially met through provision of the method and apparatus for facilitating data transmissions described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a subscriber unit can switch from a sleep mode of operation to an active mode of operation to permit reception of a beacon message as transmitted by an access point on a wireless local area network communication resource. When the subscriber unit has data to transmit (and in particular voice information), the subscriber unit then determines both a first time when transmissions from the access point during a service interval period will likely conclude and a second time, that is subsequent to the first time, to contend for an opportunity to transmit its voice information.

In a preferred embodiment, the subscriber unit can determine the first time as a function, at least in part, of the content of the beacon message. For example, by one approach, the access point can itself transmit a time that corresponds to an expected time at which the access point has determined that its transmissions will have concluded. By another approach, the access point can provide information, such as a list of subscriber units to whom the access point will next be transmitting data, which list each subscriber unit can utilize to itself estimate the time at which such transmissions will likely have concluded.

So configured, the access point can transmit a beacon message that identifies those subscriber units to whom the access point will next be transmitting information during a corresponding service interval period. Subscriber units that are not identified in this list, and who themselves have no data to transmit to the access point, can then switch to a sleep mode of operation until the next scheduled beacon message. Subscriber units that are identified in the list can remain on-line and receive their transmissions during the corresponding service interval period. Upon receiving their transmissions, they can then transmit their own data (either immediately subsequent to receiving their own transmissions in an embodiment that permits such activity or at a latter time pursuant to a contention mechanism as described below) and then switch to a sleep mode of operation until the next beacon message. Subscriber units that are not identified in the list, but that have data to transmit, can enter a sleep mode of operation until the second time as determined above. At the second time, such a subscriber unit can switch to an active mode of operation and utilize a desired contention mechanism to effect its transmissions to the access point.

Other variations on these basic approaches are presented below. In general, however, it will be seen that these embodiments permit a subscriber unit, at least during many phases of usage, to effect a sleep mode of operation that will contribute to the conservation of its own power capacity. At the same time, these embodiments are sufficient to facilitate an acceptable level of quality of service for both bearer data and voice information services.

Figure 1:
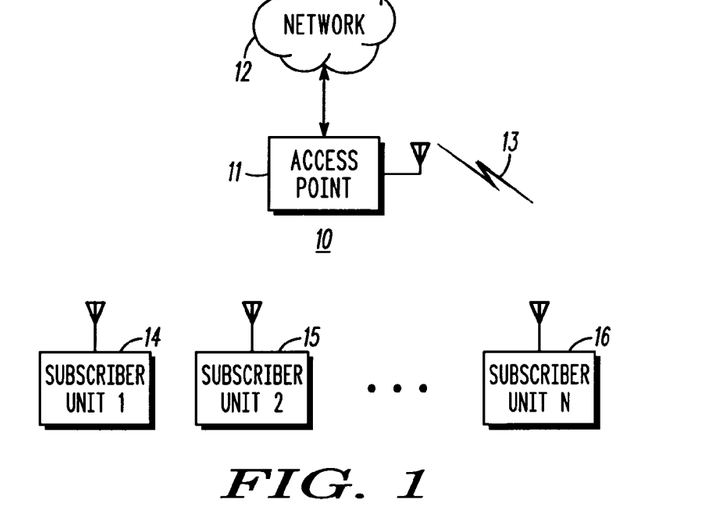
FIG. 1 comprises a block diagram depiction of a system as configured in accordance with an embodiment of the invention.

Referring now to FIG. 1, a wireless local area network 10, in a preferred embodiment, includes an access point 11 that couples to a network 12 such as, for example, a closed local network for a business or other enterprise or an open local network such as may be provided at various public locations to permit public access. In general, such a network 12 will itself include one or more links to a larger network, such as the Internet or other extranet (not shown). The access point 11 includes transceiver capability and supports wireless communications via a corresponding wireless communications resource 13 (such as one or more radio frequency carriers). For purposes of this description, this resource 13 comprises an 802.11 compatible resource. It will be understood, however, that these embodiments are not limited to only use with such a resource. (The above elements are all generally well understood in the art and hence additional details are not provided here for the sake of brevity and the preservation of focus.)

Figure 2:
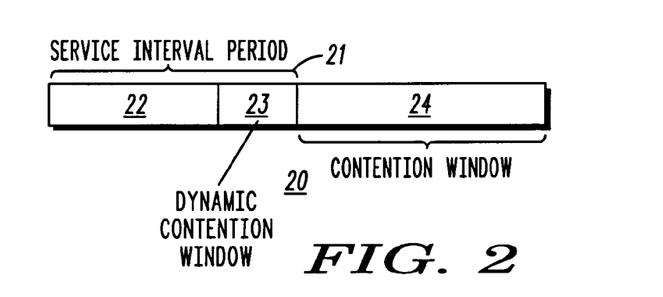
FIG. 2 comprises a schematic view of a communication resource as configured in accordance with an embodiment of the invention.

With momentary reference to FIG. 2, and in accordance with a preferred embodiment, pursuant to a general communication protocol 20 the access point 11 transmits to subscriber units from time to time (and preferably in a predictable manner) during at least a portion of a service interval period 21 of predetermined duration. For example, such a transmission can occur in a regular fashion every 100 milliseconds. A contention window 24 then follows this service interval period 21. The subscriber units can utilize a contention mechanism during this contention window 24 to effect their own transmissions to the access point 11.

Although the service interval period 21 has a substantially fixed duration, the transmission needs of the access point 11 will often require only a smaller portion of that period. Pursuant to a preferred embodiment, the access point 11 uses an earlier portion 22 of the service interval period 21 for its transmission needs. A later portion 23 of the service interval period 21 is then made available as a dynamic contention window 23 ("dynamic" in that the size of this contention window can and will vary from cycle to cycle). So configured, the subscriber units can then utilize this dynamic contention window 23 in the same manner as they use the normally scheduled contention window 24 to support their own transmissions.

Referring again to FIG. 1, such an access point 11 serves the wireless communication needs of one or more subscriber units (14 through 16). Such subscriber units can support voice services, bearer data services, or both as desired and/or as appropriate to a given application. These subscriber units can assume various form factors and serve to meet varied needs, even within a given local area network 10. For the most part, such variations are not particularly significant or important with respect to these embodiments and hence are not enumerated here. In general, these embodiments can be compatibly and effectively utilized by a wide variety of subscriber units.

Figure 3:
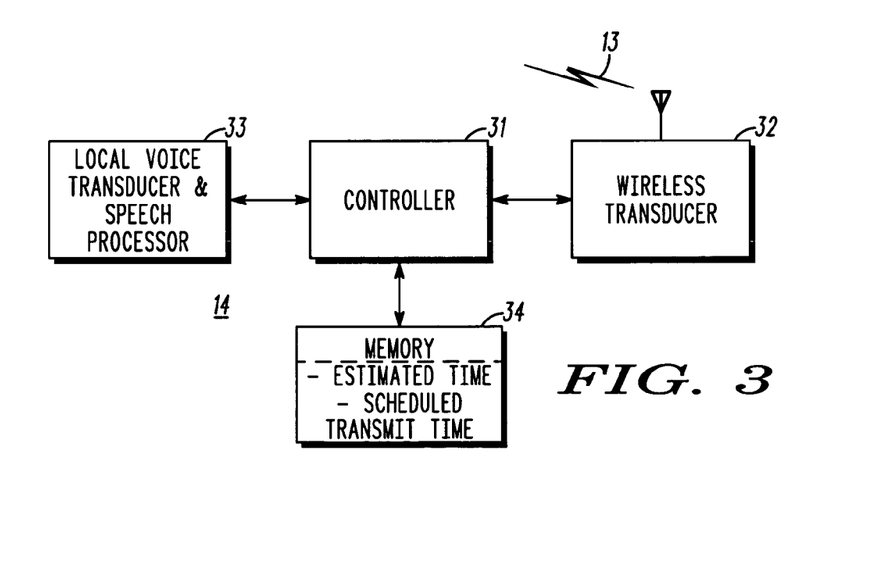
FIG. 3 comprises a block diagram depiction of a subscriber unit as configured in accordance with an embodiment of the invention.

With the above in mind, and referring now to FIG. 3, a typical subscriber unit 14 in a preferred embodiment will have a controller 31 that couples to a wireless transceiver 32, a local voice transducer and speech processor 33 (when the subscriber unit supports voice services), and a memory 34. The controller 31 can comprise an integral entity or can comprise a distributed capability, with both architectural approaches being well understood in the art. The controller 31 can also be either of fixed-operability or can be partially or fully programmable. Again, these optional approaches are well understood in the art.

In a preferred embodiment, this controller 31 can effect at least two modes of operation—an active mode of operation and a sleep mode of operation. During the sleep mode of operation, at a minimum, the wireless transceiver 32 is at least partially powered down. During an active mode of operation, at a minimum, the wireless transceiver 32 is powered up. Varying degrees and levels of so-called sleep are possible as is well understood in the art. Only a single mode of "sleep" is utilized here for the purposes of clarity and simplicity, but it will be understood that these embodiments and teachings are readily applicable to more complicated and/or hierarchically-rich power conservation schemes.

As will be explained in more detail below, the controller 31 serves, in part, to determine an estimated time as to when transmissions from an access point for a given wireless local area network will conclude during a service interval period. As noted below, this estimated time can be ascertained in a variety of ways, depending in part upon the content of the beacon message as provided by the access point 11 during the service interval period.

Such a controller 31 will also preferably serve to determine a selected transmission time, subsequent to the estimated time, when the controller will cause the wireless transceiver to transmit to the access point to thereby contend for the wireless local area network when the corresponding subscriber unit has data, such as voice data, to transmit. In a preferred embodiment, this selected transmission time can potentially be either during a service interval period (as when the access point concludes its outbound transmissions prior to conclusion of the service interval period) or subsequent thereto.

In a preferred embodiment, the controller 31 will utilize such information to schedule a time at which the controller 31 will effect a change from a sleep mode of operation to an active mode of operation and to schedule a time at which the controller 31 will cause the wireless transceiver 32 to transmit to the access point 11.

Such information can be retained in memory. Depending upon the embodiment, such memory can be integral to the controller 31 and/or at least partially external to the controller 31. As depicted in this illustrative embodiment, an outboard memory 34 serves to retain the estimated time and the scheduled transmit time as determined by the controller 31. The controller 31 then utilizes such stored information to effect the sleep mode processing and the contention-based transmission activity noted above.

Figure 4:
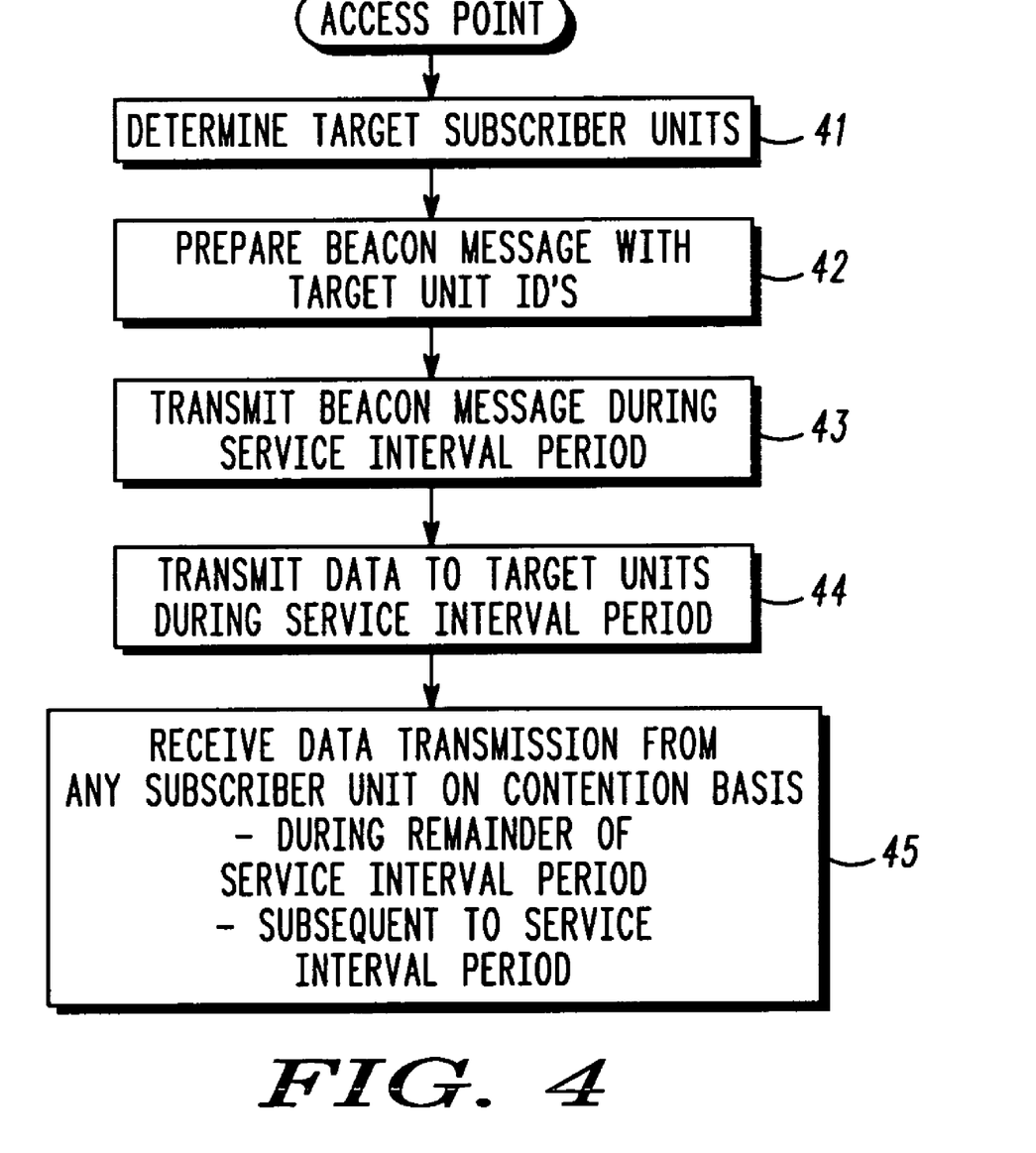
FIG. 4 comprises a flow diagram for an access point as configured in accordance with an embodiment of the invention.

Referring now to FIG. 4, pursuant to a preferred embodiment, an access point will, from time to time (and preferably in synchronicity with the service interval period cycle) determine 41 those target subscriber units for which the access point has data. For example, a node that couples to the access point via the network 12 described above with reference to FIG. 1 may be sourcing a voice communication to a subscriber unit that is being supported by the access point. Accordingly, voice packets/frames intended for that subscriber unit will arrive at the access point where they are buffered until the access point transmits such data to the corresponding target recipient. The access point can have other data from other sources as well, of course, to be transmitted to one or more of the subscriber units.

In this preferred approach, the access point then prepares 42 a beacon message that identifies those targeted subscriber units for which the access point has data (using, for example, addresses, identification numbers, or other appropriate identifiers or aliases as may be present and available in a given configuration and system for the subscriber units). For example, the access point can prepare a list of such subscriber units.

Such a list can include the subscriber units to be targeted in any of a wide variety of ways. For example, the subscriber units can simply be listed in the order in which data arrived for such subscriber units at the access point. Or, if desired, this list can include all or a portion thereof where the subscriber units are ordered as a function of at least a first criteria. Such criteria can include or can comprise, for example, any of the following:

a priority level as corresponds to at least one or more of the subscriber units (which priority level can correlate to a hierarchical designation, a quality of service level to be afforded, or the like);

recent communications activity of at least some of the subscriber units (for example, subscriber units that recently sourced a voice communication may be listed earlier relative to other subscriber units);

a relative size of the data to be transmitted to the subscriber units (for example, subscriber units that are to receive larger data packets (or a larger number of data packets) may be ordered near the end of such a list to thereby permit a larger number of other subscriber units to receive their relatively shorter packets and then assume a sleep mode of operation); and information regarding present power reserves of at least some of the subscriber units (for example, when the access point has knowledge regarding a reduced state of present power reserves for a given subscriber unit, that subscriber unit can be placed at or near the beginning of the list in order to effect provision of data to that subscriber sooner rather than later to thereby permit that subscriber unit to assume a sleep mode of operation more quickly).

It is possible, as will be shown below, for a subscriber unit to estimate a time by when the access point will have concluded its transmissions using such information. If desired, this beacon message can include additional information to further facilitate this subscriber unit activity. For example, the access point can also include in the beacon message an indication of the message size and or expected transmission duration for each of the target subscriber units and/or an indication of the aggregate data quantity or expected transmission duration for the complete data load to be transmitted.

The access point then transmits 43 this beacon message at an appropriate time during a corresponding service interval period (for example, at the beginning of the service interval period). In a preferred embodiment, this beacon message does not identify those subscriber units for which the access point has no transmission intent. Accordingly, at the conclusion of the beacon message, those subscriber units that have no data themselves to transmit and that were not identified in the beacon message can immediately assume a sleep mode of operation until the next beacon message.

Meantime, the access point can transmit 44 its buffered data to the subscriber units that were identified in the beacon message. These transmissions preferably occur during the service interval period and most preferably immediately subsequent to conclusion of the beacon transmission. These transmissions preferably occur in an order that corresponds to the order in which the subscriber units were identified in the beacon message itself In one embodiment, the access point can expect to receive an acknowledgement message from each subscriber unit as each of the latter properly receives their transmission from the access point.

Following this transmission activity, the access point can then receive 45 data transmissions from any of the subscriber units on a contention basis. (If desired, provision can also be made to accept at least short data transmissions from subscriber units concurrent with whatever acknowledgement messages as they may be otherwise transmitting to the access point in accordance with generally well understood prior art technique.) Pursuant to a preferred embodiment, these transmissions can be received both subsequent to the service interval period and during the remaining portion of a given service interval period (that is, during that portion of a service interval portion that is subsequent to the conclusion of the access point's own transmissions).

So configured, the access point can be reliably assured that necessary target subscriber units will be aware in a timely fashion of their need to receive an imminent transmission from the access point while also providing a sound informed basis for essentially all of the subscriber units to effect power saving operations to thereby conserve their limited power capacity.

Figure 5:
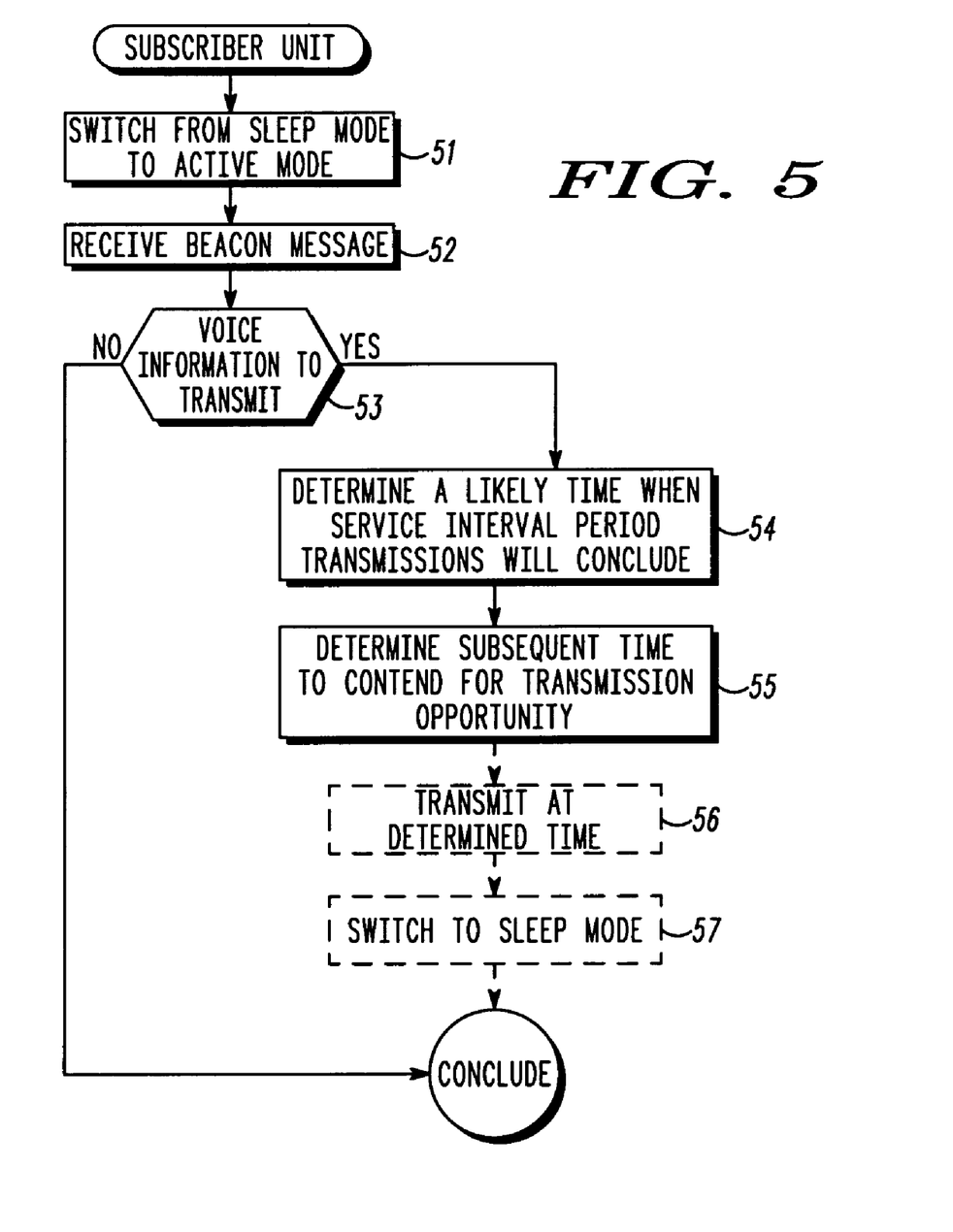
FIG. 5 comprises a flow diagram for a subscriber unit as configured in accordance with various embodiments of the invention.

Referring now to FIG. 5, a subscriber unit can effect a corresponding process that leverages such access point behaviors. Since, in a preferred embodiment, the service interval period occurs pursuant to a predictable periodic schedule, the subscriber unit, if presently in a sleep mode of operation, can switch 51 from that sleep mode to an active mode of operation prior to the service interval period. This, in turn, will permit the subscriber unit to receive 52 the beacon message when transmitted by the access point as described above at the previously scheduled time. In a preferred embodiment this beacon message includes information that identifies the subscriber units to whom the access point will next be transmitting targeted information and/or other information that can be used by the subscriber unit to determine when the access point may likely conclude its transmissions of data to the targeted subscriber units.

When the subscriber unit determines 53 that it has no information, such as voice information, to transmit to the access point, the process can simply conclude and the subscriber unit can, for example, initiate a power saving mode of operation (such as, for example, a sleep mode of operation). When the subscriber unit does have information to transmit, however, the subscriber unit can then preferably determine 54 a likely time as to when the access point's transmissions during the service interval period will conclude. This determination can be based on a variety of criteria and informational content as may best reflect the information that is provided by the access point during the beacon message as is noted above.

Using this estimated time, the subscriber unit can then determine 55 a subsequent time to then contend for a transmission opportunity. Pursuant to one embodiment, the subscriber can utilize a random or pseudo-random mechanism to facilitate this selection. Such an approach can aid in preventing multiple subscriber units (who have all likely calculated an identical or at least similar time by when the transmissions of the access point will conclude) from transmitting in unison at the same time with one another. Although a particular transmission time can be selected on at least a substantially pseudo-random basis, a predetermined range of available times can be used to nevertheless constrain the candidate times to those that fall between the conclusion of the access point's transmissions and the conclusion of the contention window (or, to put it another way, to a range of times that includes the dynamic contention window and usual contention window described above with reference to FIG. 2).

The subscriber unit will then transmit 56 to the access point at the determined time. More particularly, in a preferred embodiment, the subscriber unit will contend for a transmission opportunity sufficient to permit imparting its complete data payload to the access point. A variety of contention protocols are known in the art, and these teachings are compatible with most or all such previously known or hereafter-developed contention schemes.

Following such transmission, the subscriber unit can then optionally, but preferably, switch 57 to a sleep mode of operation to thereby conserve power resources. If desired, initiation of the sleep mode can be made contingent upon receiving an acknowledgement message from the access point in response to transmission of the subscriber unit information. In a preferred embodiment the subscriber unit will also schedule a next time to switch to an active mode of operation. For example, the subscriber unit can schedule a next time to switch to an active mode to permit timely reception of a next scheduled or anticipated service interface period.

These basic processes permit a variety of subscriber unit actions that, in various ways as may suit the needs of various systems and applications, ultimately facilitate both a timely exchange of data while also fostering a suitable basis to effect a power conservation scheme of choice.

Figure 6:
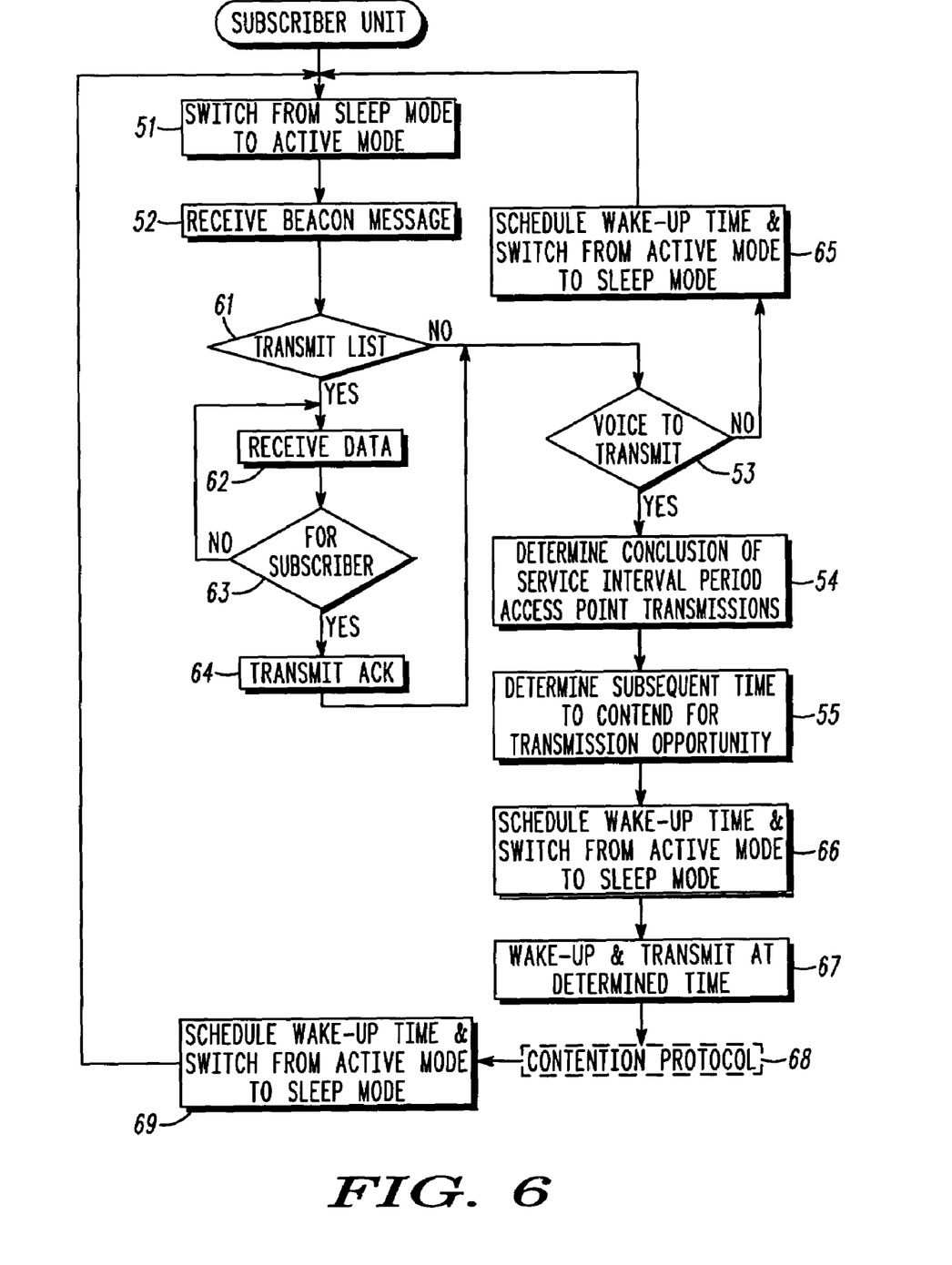
FIG. 6 comprises a flow diagram for a subscriber unit as configured in accordance with other embodiments of the invention.

To illustrate, and referring now to FIG. 6, a subscriber unit can switch 51 from a sleep mode to an active mode and then receive 52 a beacon message as described above. The subscriber unit can then determine 61 whether the beacon message has identified the subscriber unit as being a target recipient of data to be subsequently transmitted. When true, the subscriber unit can then receive 62 subsequent transmissions from the access point and determine 63 whether such transmissions are intended for the subscriber unit. This process can continue until the correctly targeted transmission is received and then acknowledged 64 by the subscriber unit. (If desired, the subscriber unit can include with its acknowledgement transmission such data as it may have to transmit to the access point. This approach may work particularly well when the subscriber unit has only a small quantity of data to transmit to the access point.)

Following reception of such data from the access point, or when no such data exists to be transmitted to the subscriber unit, the subscriber unit determines 53 whether it has data to transmit to the access point (in this illustrative embodiment, it is presumed that such data includes, or fully comprises, voice information). When no such data exists, the subscriber unit schedules 65 a wake-up time and then switches from an active mode of operation to a sleep mode of operation.

When the subscriber unit does have data to transmit, the subscriber unit determines 54 a likely time by when the access point transmissions during the service interval period will have concluded as described above. This information, in turn, serves to permit determination 55 of a subsequent time at which the subscriber unit will contend for a transmission opportunity. In a preferred embodiment, this subsequent time can potentially occur during the service interval period (subsequent, of course, to the transmissions of the access point) or during the contention window that follows the service interval period.

In a preferred embodiment, the subscriber unit can then schedule 66 a wake-up time that will permit switching from a sleep mode of operation to an active mode of operation in sufficient time to permit the subscriber unit to contend for the transmission opportunity at the selected time. The subscriber unit can then enter a sleep mode (or effect such other power conservation strategy as may be appropriate to the circumstances). At the scheduled time the subscriber unit can then wake-up 67 and contend for the desired transmission opportunity (using such contention protocol 68 as may be appropriate or required in a given setting or system). Following successful transmission of the subscriber unit data, the subscriber unit can then schedule 69 a wake-up time (such as a time that corresponds to when the next service interval period occurs) and switch from an active mode of operation to a sleep mode of operation.

Figure 7:
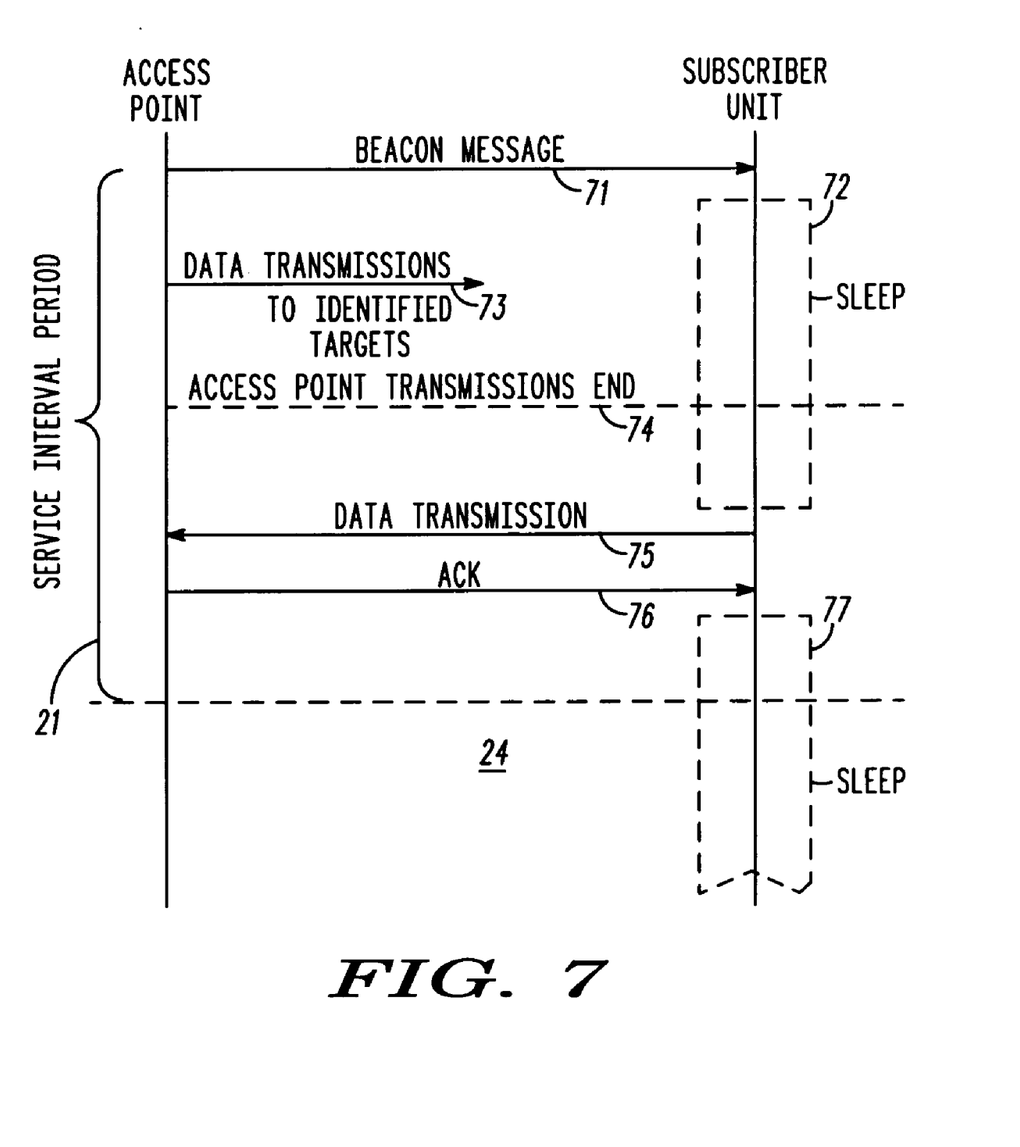
FIG. 7 comprises a timing diagram as configured in accordance with various embodiments of the invention.

Such behaviors, and the potential benefits that correspond thereto, are perhaps more readily evident upon making reference to a timing diagram as shown in FIG. 7. During the service interval period 21, the access point transmits its beacon message 71, including the transmission target list, as described in detail above. When a given subscriber unit determines from this beacon message 71 that it will not be receiving a transmission from the access point during this service interval period 21, the subscriber unit can determine a time 74 by when the access point transmissions will end and then determine a corresponding time at which the subscriber unit should attempt to effect its transmission to the access point. The subscriber unit can then switch to a sleep mode 72 of operation. This permits the subscriber unit to conserve power during a time when the access point is transmitting data 73 to other subscriber units as per the beacon message list.

At a time subsequent to when the access point transmissions have ended 74 (which time may be during the contention window 24 that follows the service interval period or during a dynamic contention window that ranges between the conclusion of the access point's transmissions 74 and the conclusion of the service interval period 21) the subscriber unit switches to an active mode of operation and contends for its transmission opportunity. When successful, the subscriber unit makes its data transmission 75, receives an acknowledgement message 76 from the access point, and again enters a sleep mode 77.

It can be seen that, depending to some extent upon the transmission and reception needs as pertain to a given moment, considerable power savings are available to a subscriber unit when operating in accord with these teachings. Furthermore, these embodiments can be implemented with little or no additional incremental costs aside from the initial programming investment.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
   at a wireless subscriber unit:
   switching from a sleep mode of operation to an active mode of operation;
   receiving a beacon message on a wireless local area network communication resource from an access point;
   when voice information exists to transmit, determining:
   a first time when transmissions from the access point during a service interval period will likely conclude; and
   a second time, subsequent to the first time, to contend for an opportunity to transmit the voice information.

2. The method of claim 1 wherein receiving a beacon message comprises receiving the beacon message at a previously scheduled time.

3. The method of claim 1 wherein receiving a beacon message comprises recovering information from the beacon message that identifies subscriber units to whom the access point will next be transmitting targeted information.

4. The method of claim 3 wherein determining a first time when transmissions from the access point during a service interval period will likely conclude comprises estimating the first time as a function, at least in part, of the information that identifies subscriber units to whom the access point will next be transmitting targeted information.

5. The method of claim 4 wherein determining a second time to contend for an opportunity to transmit the voice information comprises potentially selecting a second time that is within a service interval period that supports the beacon message.

6. The method of claim 1 wherein determining a first time when transmissions from the access point during a service interval period will likely conclude comprises:
   receiving information from the access point;
   using the information from the access point to determine the first time.

7. The method of claim 6 wherein receiving information from the access point comprises receiving information from the access point that comprises at least an estimate of the first time.

8. The method of claim 6 wherein receiving information from the access point comprises receiving information from the access point that can be used by the subscriber unit to at least estimate the first time.

9. The method of claim 8 wherein receiving information from the access point that can be used by the subscriber unit to at least estimate the first time comprises receiving information that comprises an indication of a quantity of data to be transmitted by the access point.

10. The method of claim 9 wherein receiving information that comprises an indication of a quantity of data to be transmitted by the access point comprises receiving information that comprises an indication of a quantity of data to be transmitted by the access point during a service interval period.

11. The method of claim 1 wherein determining a second time to contend for an opportunity to transmit the voice information comprises selecting a second time in at least a substantially pseudo-random fashion.

12. The method of claim 11 wherein selecting a second time in at least a substantially pseudo-random fashion comprises selecting the second time in at least a substantially pseudo-random fashion within a predetermined range of available times.

13. The method of claim 1 wherein, when the beacon message identifies the subscriber unit as being a subscriber unit to which the access point will transmit voice data:
   receiving a voice data transmission from the access point during a service interval period that supports the beacon message.

14. The method of claim 13 and further comprising transmitting an acknowledgment message to the access point subsequent to receiving the voice data transmission.

15. The method of claim 1 and further comprising:
   at the second time, transmitting a message to the access point to thereby contend for the wireless local area network communication resource to transmit the voice information.

16. The method of claim 15 and further comprising:
   switching from an active mode of operation to a sleep mode of operation.

17. The method of claim 16 wherein switching from an active mode of operation to a sleep mode of operation further comprises receiving an acknowledgement message from the access point in response to transmission of the voice information.

18. The method of claim 16 wherein switching from an active mode of operation to a sleep mode of operation comprises scheduling a next time to switch to an active mode of operation.

19. The method of claim 18 wherein scheduling a next time to switch to an active mode of operation comprises scheduling the next time as a function, at least in part, of a next scheduled service interval period from the access point.

20. The method of claim 1 and further comprising, when voice information exists to transmit, switching from the active mode of operation to the sleep mode of operation prior to the second time.

21. The method of claim 20 and further comprising scheduling a time, prior to the second time, to switch from the sleep mode of operation to the active mode of operation to thereby permit transmission of the voice information.

22. A method comprising the steps of:
   at an access point for a wireless local area network providing services to a plurality of subscriber units:
   determining those subscriber units of the plurality of subscriber units for which the access point currently has data to transmit;
   preparing a beacon message that identifies those subscriber units for which the access point currently has data to transmit but not those subscriber units for which the access point currently has no data to transmit;
   transmitting, during a service interval period, the beacon message;

transmitting, during the service interval period, data to those subscriber units that were identified in the beacon message;

subsequent to transmitting the data to those subscriber units that were identified in the beacon message, receiving voice data transmissions from any of the subscriber units on a contention basis regardless of whether such voice data transmissions are sourced during the service interval period or subsequent thereto.

23. The method of claim 22 wherein transmitting, during the service interval period, data to those subscriber units that were identified in the beacon message comprises transmitting data to those subscriber units in an order that corresponds to an order in which the subscriber units are identified in the beacon message.

24. The method of claim 22 wherein preparing a beacon message that identifies those subscriber units for which the access point currently has data to transmit comprises placing those subscriber units into a particular order as a function of at least a first criteria.

25. The method of claim 24 wherein the first criteria comprises at least one of:
   a priority level as corresponds to at least some of the subscriber units;
   recent communications activity of at least some of the subscriber units;
   a relative size of the data to be transmitted to those subscriber units; and
   information regarding present power reserves of at least some of the subscriber units.

26. The method of claim 22 and further comprising:
   in response to receiving a voice data transmission, transmitting an acknowledgement message to the subscriber unit that sourced the received voice data transmission.

27. A wireless local area network subscriber unit having voice transmission capability, comprising:
   a wireless transceiver that is compatible with a wireless local area network communication resource;
   a controller that is operably coupled to the wireless transceiver and that has an active mode of operation and a sleep mode of operation;
   a local voice transducer and speech processor that is operably coupled to the controller;
   a memory that is operably coupled to the controller wherein the memory has stored therein, at least from time to time:
      an estimated time as to when transmissions from an access point for the wireless local area network will conclude during a service interval period;
      a selected transmission time, subsequent to the estimated time, when the controller will cause the wireless transceiver to transmit to the access point to thereby contend for the wireless local area network communication resource when the subscriber unit has voice data to transmit, which selected transmission time can potentially be either during a service interval period or subsequent to the service interval period.

28. The wireless local area network subscriber unit of claim 27 wherein the wireless local area network communication resource is compatible with 802.11.

29. The wireless local area network subscriber unit of claim 27 wherein the controller comprises estimation means for estimating the estimated time as a function, at least in part, of the contents of a beacon message from the access point.

30. The wireless local area network subscriber unit of claim 29 wherein the controller further comprises scheduling means for scheduling the selected transmission time as a function, at least in part, of the estimated time.

31. The wireless local area network subscriber unit of claim 30 wherein the scheduling means further schedules the selected transmission time in at least a pseudo-random fashion.

32. The wireless local area network subscriber unit of claim 31 wherein the controller further comprises sleep means for switching the subscriber unit from the active mode of operation to the sleep mode of operation subsequent to transmitting the voice data to the access point at the selected transmission time.

* * * * *